Figure 1:
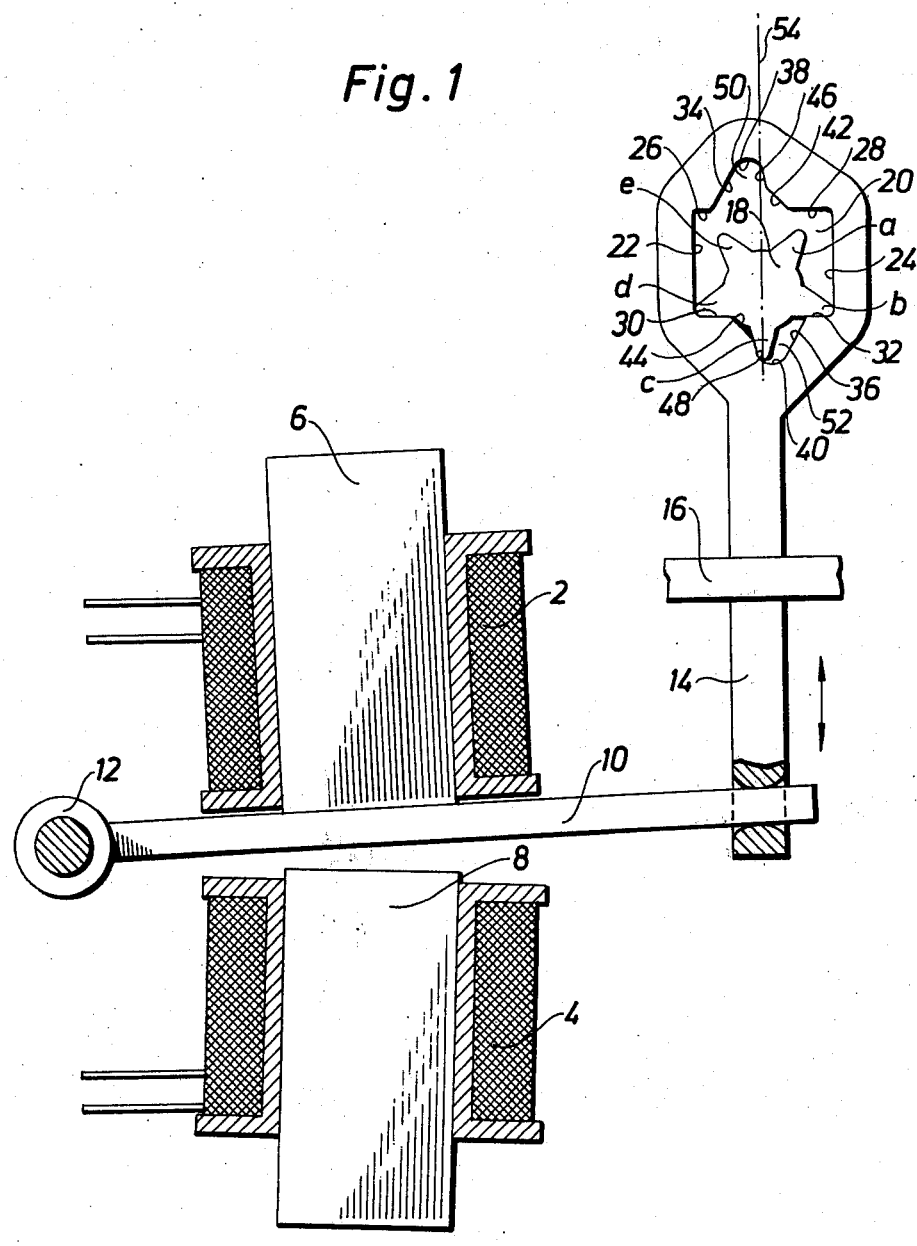

United States Patent [19] [11] 3,969,945
Englund [45] July 20, 1976

[54] INDEXING MECHANISM
[75] Inventor: G. Roland Englund, Stockholm, Sweden
[73] Assignee: Svenska Dataregister AB, Sweden
[22] Filed: Aug. 5, 1974
[21] Appl. No.: 494,477

[30] Foreign Application Priority Data
Oct. 3, 1973 Sweden .............................. 7313468

[52] U.S. Cl. ..................................... 74/128; 74/88; 74/817
[51] Int. Cl.² ......................................... F16H 27/02
[58] Field of Search ............ 74/142, 129, 128, 126, 74/111, 88, 817

[56] References Cited
UNITED STATES PATENTS
2,933,930  4/1960  Huhn ................................... 74/129
2,972,487  2/1961  Blackburn ......................... 74/817 X
3,136,335  6/1964  Beech et al. ...................... 74/817 X
3,646,826  3/1972  Sahlgren et al. ...................... 74/142

Primary Examiner—Benjamin W. Wyche
Assistant Examiner—F. D. Shoemaker
Attorney, Agent, or Firm—Robert F. Rotella; Norman Friedman; Stephen A. Roen

[57] ABSTRACT

An indexing device has a toothed gear actuated by a reciprocating yoke impinging on a tooth to turn the gear and to hold the gear in a fixed position upon further movement of the yoke in the same direction. The yoke is reciprocated through a cam connection with a pivoted lever which in turn is acted upon alternately by two electromagnets. Each stroke of the yoke rotates the indexing gear one tooth.

8 Claims, 3 Drawing Figures

INDEXING MECHANISM

The present invention relates to an indexing or stepping mechanism, comprising an indexing wheel provided with at least three cogs and being adapted for intermittent driving of a member connected to said indexing wheel, and an indexing arm adapted to be moved by actuator means between two limit positions, thereby to cause the indexing wheel to rotate through a predetermined angle, said indexing arm at least partially encircling the indexing wheel and being provided with two recesses on both sides thereof.

A large number of different indexing mechanisms have long been known to the art. One such mechanism includes an indexing wheel comprising one or more cogs and a pivotally mounted stirrup having two teeth which are located on both sides of the indexing wheel, the arrangement being such that the wheel is stepped forward each time a tooth engages a cog on the side flank of the wheel. The stirrup is spring biased in one direction and is returned by the spring after a stirrup-actuating member, such as a cam plate or an electromagnet, has rotated the stirrup and therewith the indexing wheel through one step, corresponding to one pitch of the indexing wheel.

This previously known mechanism is encumbered with a number of disadvantages. One disadvantage is that special means are required for orienting the indexing wheel, i.e. for adjusting said wheel so that it is held against both rotational and radial movement immediately subsequent to each rotary step thereof. Another disadvantage is that springs are required to return the stirrup to its rest position.

An object of the present invention is to eliminate or to substantially reduce the disadvantages encountered with previously known indexing mechanisms.

Accordingly, the indexing mechanisms according to the invention is mainly characterized in that said recesses having mutually substantially the same configuration and comprise first surfaces which co-act with the cogs on said indexing wheel and which are preferably located on both sides of a center line through said wheel, along which line the indexing arm is substantially moved and each of which surfaces forms an acute angle with said center line or is located parallel therewith, the indexing arm being provided with second and third surfaces located adjacent each recess on both sides thereof and arranged to co-act with the cogs on said indexing wheel, each of which second and third surfaces forms an angle greater than 45° with said first surfaces, and three of the cogs of said wheel being arranged to bear against the first, second and third surfaces when the indexing arm adopts one of its two limit positions.

Figure 2:
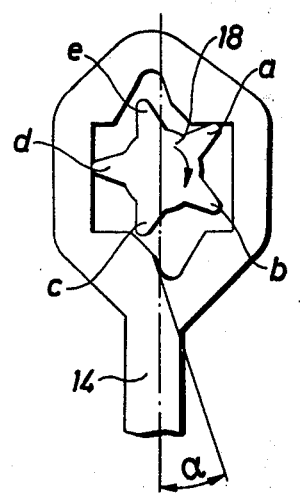
Figure 3:
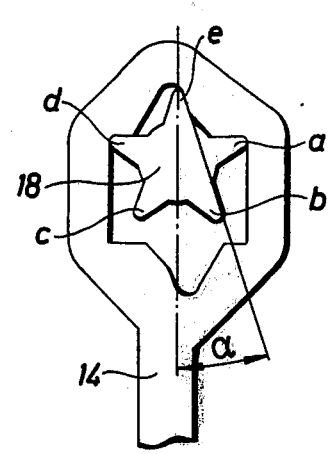

So that the invention will be more readily understood and further features thereof made apparent, an indexing mechanism constructed in accordance with the invention will now be described by way of example only with reference to the accompanying drawings, in which FIG. 1 is a front view of an indexing mechanism constructed in accordance with the present invention, the indexing wheel being located in a first rest position FIG. 2 shows part of the indexing mechanism according to FIG. 1, but with the indexing wheel having been moved slightly from the position shown in FIG. 1 and FIG. 3 shows part of the indexing mechanism according to FIG. 1, but with the indexing wheel rotated somewhat in relation to the position shown in FIG. 2, to a second rest position.

In FIG. 1 there is shown two electromagnets 2 and 4 which are securely mounted on a structure (not shown) and which are alternately energized by an appropriate, conventional pulse generator (not shown). As will be seen from FIG. 1, the cores 6, 8 of the electromagnets 2 and 4 are not in a straight line one with the other, but are inclined slightly in relation to each other, so that armature 10, which is pivotally mounted to said structure at 12, is able to lie against the whole of the core surface of the magnet facing the armature when one of the electromagnets is energized.

The armature 10 is pivotally connected to an indexing arm 14 which is prevented from moving horizontally in a plane perpendicular to the plane of the paper in FIG. 1, by suitable guide means 16, but which is permitted to move slightly horizontally in a plane perpendicular to the first mentioned plane. In addition hereto, the indexing arm 14 may, of course, be moved in a path having a relatively large radius of curvature upwardly and downwardly in the plane of the paper, depending on which of the electromagnets is energized, this movement being intended to cause rotation of an indexing wheel 18 around the center shaft thereof.

The indexing wheel 18 is mounted on a rotating or indexing member (not shown), which member may comprise, for example, a shaft for advancing stepwise a paper tape or a character drum on the periphery of which are arranged different characters and which must assume a determined, exact position both radially and peripherally so that each character can be accurately recorded on a record medium. The indexing wheel 18, which in the illustrated embodiment is provided with five symmetrically arranged cogs $a$, $b$, $c$, $d$ and $e$, is suitably made of steel or a suitable hard synthetic resin material and has an axial extension which is equal to or slightly greater than the axial extension of the indexing arm 14 in the region of the indexing wheel.

The indexing arm 14, which may also comprise a suitable hard synthetic resin material, is enlarged at the upper portion thereof and encloses a cavity 20 which is closed in the plane of the paper and which is defined by two generally opposed vertical side surfaces 22 and 24, two upper horizontal surfaces 26 and 28, two lower horizontal surfaces 30 and 32, a first upper oblique surface 34, a first lower oblique surface 36, an upper curved surface 38, a lower curved surface 40, a second upper oblique surface 42, a second lower oblique surface 44, an upper abutment surface 46 and a lower abutment surface 48. As will be seen from the Figures, recesses 50 and 52, which are defined by the surfaces 34, 38, 46 and 48, 40, 36, respectively, are vertically off-set relative to one another while the side surfaces 22 and 24 are located at the same distance from the vertical center line 54 of the indexing wheel 18.

Consequently, when the indexing arm 14 is pulled downwardly from the first rest position shown in FIG. 1 upon excitation of the electromagnet 4, the first cog $c$ is released from the first recess 52, although the indexing wheel will not rotate until the cog $a$ engaged the upper, horizontal surface 28, said cog then being rotated clockwise until the upper flank surfaces of the cogs $a$ and $d$ lie against the horizontal upper surfaces 28 and 26, respectively, and the right flank of the cog $e$ in FIG. 3 abuts the upper abutment surface 46. This second rest position, which is shown in FIG. 3, is adopted after the position shown in FIG. 2 and is completed when the indexing arm has reached its lowermost position. When the electromagnet 2 is subsequently energized, the indexing arm 14 is drawn upwardly, whereupon the cog c strikes the horizontal surface 30 and causes the indexing wheel 18 to rotate until the cogs a and c abut the horizontal surfaces 32 and 30 respectively, and the cog b lies against the lower abutment surface 48. The position now adopted by the indexing wheel 18 is identical with the position shown in FIG. 1, with the exception that the cog a has taken the place of cog b and that cog b has taken the place of cog c, and so on.

Each time one of the magnets 2 and 4 is energized, i.e. with each movement of the indexing arm 14 from the position shown in FIG. 1 to the position shown in FIG. 3 or vice versa, the indexing wheel 18 is thus rotated through one tenth of a complete revolution, i.e. through 36°.

So that the indexing wheel 18 is not hindered by the indexing arm 14 during rotation of said arm, the arm is provided with chamfers in the form of oblique surfaces 42 and 44 which form an angle of approximately 45° with the horizontal plane, and with recesses 50 and 52, the surfaces 34 and 36 of which recesses are located more remotely from the center line 54 than the abutment surfaces 46 and 48. Despite the presence of the chamfers 42, 44 and the recesses 50, 52, the horizontal surfaces 26, 28, 30 and 32 have sufficient extension to enable the indexing wheel 18 to be positioned exactly in the carefully determined rest positions and to actuate the cog flanks of the indexing wheels so that the indexing wheel can be rotated to said positions with the least possible resistance.

Upon rotation in the cavity 20, the top of at least one cog on the indexing wheel 18 bears against one of the side surfaces 22 and 24, and hence a certain horizontal orienting effect or guiding effect in the plane of the paper is obtained as the indexing arm 14 moves between its two limit positions.

The cog e on the indexing wheel 18 engages the abutment surface 46 on the indexing arm substantially at the same time as said arm 14 reaches the second rest position shown in FIG. 3. Thus, the cog e engages said abutment surface substantially simultaneously as the upper flank surfaces of cogs d and a engage in their entirety the upper horizontal surfaces 26 and 28 respectively.

When the indexing wheel 18 is rotated by the indexing arm 14, the wheel and the member connected thereto for intermittent movement obtain a kinetic force which is a function of the speed of rotation (the angular speed) and the moment of inertia of the indexing wheel and the member. If the aforementioned member comprises a relatively large and heavy steel shaft and the rate at which rotation is effected is high the kinetic force is consequently great, and hence the angle under which the cog e engages the surfaces 46 on the indexing arm 14 should be as small as possible in relation to the horizontal plane, so that the indexing arm is not affected by the kinetic force of the indexing wheel with said member connected thereto, so that said wheel is imparted an upward movement (FIG. 3) i.e. is moved from the rest position to an intermediate position or back to the rest position, as shown in FIG. 1, without the electromagnet 2 having been energized. With the illustrated embodiment the angle $\alpha$ between the abutment surface 46 and the vertical plane and between the abutment surface 48 and the vertical plane is 18°, i.e. the direction of the resultant mass forces of the indexing wheel 18 with said associated member and the direction of the kinetic force in the center of the surface 46 form an angle with the direction of movement of the indexing arm 14 of 90° − 18° = 72°. The angle $\alpha$ equals 18° because the angle between two flank surfaces on each cog $a - e$ is 36° (the profile angle), which in turn is because each cog on an indexing wheel having five cogs must necessarily have an angle between the flanking surfaces of 36°, in order that those flanking surfaces on alternate cogs (for example cogs d and a) which lie nearest one another shall lie in line with each other. This is important, because the indexing wheel 18 should abut, in the two rest positions of the indexing arm 14, the horizontal surfaces 26, 28, 30 and 32 over as wide an area as possible.

If the indexing wheel is provided with seven cogs instead of the illustrated five, the angle $\alpha$ would be ~ 12.85°, since in order for adjacent flanking surfaces on alternate cogs to lie on a straight line, the profile angle in this case must be: $360°/(7 \cdot 2) \approx 25.7°$. Thus, with an increasing number of cogs on the indexing wheel, the angle $\alpha$ decreases while, conversely, said angle increases with a decreasing number of cogs.

As soon as a flanking surface on a cog has engaged the surface 46 or 48, the flanking surfaces of the two adjacent cogs abut the horizontal surfaces 26, 28 and 30, 32 respectively, and hence the indexing wheel 18 is held firmly by three surfaces on the indexing arm 14, which means that said wheel is set (oriented) exactly in the desired angular position without risk of the wheel being rotated when the said member associated therewith is subjected to peripheral loads, and as a result of the positions and angles of the surfaces 46, 48 the indexing arm is prevented from being returned to its rest positions as a result of the mass forces and kinetic forces on the indexing wheel and associated member, without the electromagnets 2, 4 being energized.

To enable the angle $\alpha$ to be made smaller than what is determined by the number of cogs on the indexing wheel 18, thereby to reduce the forces which actuate the indexing arm 14 for said vertical upward and downward movement when one of the cogs of said wheel engages the surface 46 or 48, the two flanking surfaces of each cog can be made parallel at the top of the cog through a small distance. Thus, as seen in FIG. 1, the surfaces 46 and 48 can be made to extend vertically, i.e. to form an angle of zero degrees with the center axis 54, whereupon the mass forces and kinetic forces of the indexing wheel 18 and associated member will only effect the indexing arm 14 horizontally, i.e. no force component will act in a vertical direction. In this instance, however, there will not be complete abutment of the cogs $a-e$ with the horizontal surfaces 26, 28, 30, 32. Furthermore, it has been found that with the case of parallel flanking surfaces the indexing wheel 18 is more difficult to manufacture and is more readily worn.

The force of the electromagnets 2 and 4 is selected so that said magnets are not only capable of moving the indexing arm 14 upwards and downwards to the rest positions shown in FIGS. 1 and 2, for rotation of the indexing wheel 18, but also able to retain said arm in these positions even though the angle $\alpha$ should be somewhat larger than 0°. The electromagnets 2 and 4 are energized at pre-determined points of time which are so selected that the magnetic force field is strongest when a cog $a - e$ engages the abutment surface 46 and 48. This is done so that the indexing arm 14 at the moment of engagement is not moved by the mass and kinetic forces of the indexing wheel 18 with associated member against the action of the energized electromagnet.

The invention is not restricted to the described and illustrated embodiment thereof, but can be modified within the scope of the accompanying claims.

I claim:
1. An indexing mechanism comprising:
   an indexing wheel having at least three cogs;
   an indexing arm movable by an actuator device between two limit positions;
   said indexing arm at least partially enclosing said indexing wheel and being provided with first and second recess means;
   each of said recess means including a first surface for coacting with a first cog whenever said indexing arm is moved from a first limit position to a second limit position to thereby move said indexing wheel through a predetermined angle;
   each of said recess means further including second and third surfaces adapted for engaging, respectively, a portion of said first cog and a portion of the next-adjacent cog when said indexing arm is in a limit position.
2. An indexing mechanism as set forth in claim 1, wherein:
   said first and third surfaces are parallel and substantially perpendicular to the line of travel of said arm.
3. An indexing mechanism as set forth in claim 2, wherein:
   each of said recess means further comprises a portion generally conforming to the shape of a cog disposed between said second and third surfaces for receiving the cog disposed adjacent to said first cog when said indexing arm is in a limit position.
4. An indexing mechanism as set forth in claim 3, wherein:
   each of said cogs is formed by a pair of angled straight-line portions;
   the straight line portion of one cog being co-linear with a straight line portion of a next-adjacent cog.
5. An indexing mechanism as set forth in claim 4, wherein:
   the angle, $\alpha$, being half the angle between said pair of straight-line portions equals, in degrees: 360/4x number of indexing wheel cogs
6. An indexing mechanism as set forth in claim 5, wherein:
   said recess means cog-shaped portion includes a chamfered surface.
7. An indexing mechanism as set forth in claim 1, wherein:
   said indexing arm is arranged to be moved between its limit positions by two electromagnets arranged on both sides of an armature which is connected to the indexing arm and which upon alternate excitation of the electromagnet is arranged to move the indexing arm between its two limit positions.
8. An indexing machanism as set forth in claim 7, wherein:
   excitation of each electromagnet is effected at a predetermined point of time so selected that the magnetic force field has a maximum strength when that surface of said first surfaces which is located nearest the indexing wheel is engaged by a cog arranged thereon.

* * * * *

UNITED STATES PATENT AND TRADEMARK OFFICE
CERTIFICATE OF CORRECTION

PATENT NO. : 3,969,945
DATED : July 20, 1976
INVENTOR(S) : G. Roland Englund

It is certified that error appears in the above-identified patent and that said Letters Patent are hereby corrected as shown below:

Column 4, line 51, "effect" should be --affect--

Column 6, line 26, "machanism" should be --mechanism--

Signed and Sealed this

*Fifteenth* Day of *November 1977*

[SEAL]

*Attest:*

RUTH C. MASON
*Attesting Officer*

LUTRELLE F. PARKER
*Acting Commissioner of Patents and Trademarks*